US006105372A

United States Patent [19]

Mandai et al.

[11] Patent Number: 6,105,372

[45] Date of Patent: Aug. 22, 2000

[54] GAS TURBINE COMBUSTOR

[75] Inventors: Shigemi Mandai; Masataka Ota; Katsunori Tanaka; Shinji Akamatsu, all of Takasago, Japan

[73] Assignee: Mitsubishi Heavy Industries, Ltd., Tokyo, Japan

[21] Appl. No.: 09/145,499

[22] Filed: Sep. 2, 1998

[30] Foreign Application Priority Data

Sep. 8, 1997 [JP] Japan .................................... 9-242690

[51] Int. Cl.[7] ........................................................ F02C 1/00

[52] U.S. Cl. ................................................................ 60/755

[58] Field of Search ................................................ 60/750

[56] References Cited

U.S. PATENT DOCUMENTS 2,636,345 4/1953 Zoller .

2,659,201 11/1953 Krejci .

5,289,686 3/1994 Razdan et al. ............................ 60/755

5,479,781 1/1996 Fric et al. ................................ 60/755

*Primary Examiner*—Charles G. Freay

*Attorney, Agent, or Firm*—Wenderoth, Lind & Ponack, L.L.P.

[57] ABSTRACT

A gas turbine combustor having a combustion chamber (10) with a steam-cooled peripheral wall (2) has an air hole (1) for injecting dilution air therethrough bored in the peripheral wall (2) on an upstream side of the combustion chamber (10). The air is thereby supplied through the air hole (1) into the vicinity of an inner surface of the peripheral wall (2) to form a film flow of air, and an increase of the fuel concentration there is suppressed. The dilution air is preferably supplied from a gas turbine compressor (6).

5 Claims, 4 Drawing Sheets

GAS TURBINE COMBUSTOR

BACKGROUND OF THE INVENTION

1. Field of the Invention

The present invention relates to a combustor of a gas turbine, specifically to a combustor in which a peripheral wall is cooled by steam.

2. Description of the Prior Art

FIG. 3 is a constructional view of a conventional gas turbine plant. In FIG. 3, numeral 6 designates a compressor, numeral 7 designates a combustor, numeral 8 designates a gas turbine connected to the compressor 6 coaxially and numeral 9 designates an exhaust gas boiler for recovering energy of the exhaust gas after being used for driving the gas turbine 8.

In operation of the gas turbine plant constructed as mentioned above, combustion air which has been compressed by the compressor 6, driven coaxially with the gas turbine 8, is led into the combustor 7. In the combustor 7, fuel is injected for combustion into the compressed combustion air. Combustion gas therefrom is led into the gas turbine 8 for expansion and then is led into the exhaust gas boiler 9. It is to be noted that, although not shown in the figure, a generator is connected to an output shaft of the gas turbine 8 to be driven by the gas turbine 8 so as.

In the exhaust gas boiler 9, water is heated by the exhaust gas sent from the gas turbine 8 to generate steam. This steam is led into and drives a steam turbine (not shown). Also, a portion of the steam is led into the combustor 7 as cooling steam to be used for cooling of a peripheral wall of the combustor 7.

FIG. 4 is a cross sectional view of a main part of one example of a prior art combustor, in which a peripheral wall of the combustor is cooled by cooling steam. In FIG. 4, the combustor 7 of the steam-cooled system is a combustor for generating a combustion gas of a high temperature, about 1,500° C., at the gas turbine inlet. Numeral 2 designates a peripheral wall, which is a steam-cooled wall constructed such that steam flows in the wall for cooling of the wall surface. The steam has been generated at the exhaust gas boiler 9 to do expansion work in a steam turbine (not shown) and thus has been temperature-reduced to a certain level to be used as the cooling steam.

Numeral 10 designates a combustion chamber, which is surrounded by the peripheral wall 2 and constructed such that combustion air from the compressor 6 is led thereinto through a wall portion 20 on an upstream side thereof. Also, in the wall portion 20 on the upstream side of the combustion chamber 10; there is provided a pilot nozzle 4 at a central portion thereof. Also provided are a plurality of main nozzles 3, arranged with equal intervals along a circumferential direction of the combustor 7; on an outer side of the pilot nozzle 4. Numeral 2*a* designates a combustion gas outlet.

In operation of the combustor 7 constructed as mentioned above, fuel is injected from the pilot nozzle 4 into the combustion air in the combustion chamber 10 to be ignited and then main fuel is injected from the plurality of main nozzles 3 into the flame so ignited to be mixed and burned with the air in the combustion chamber 10 and generate combustion flame 5. Combustion gas so generated flows out of the outlet 2*a* of the combustion chamber 10 to be sent to the gas turbine 8 for drive thereof.

There are, however, shortcomings as mentioned below in the prior art gas turbine combustor of a steam-cooled system shown in FIG. 4. That is, there is formed a low velocity zone of fuel and air flow in the vicinity of the inner surface of the peripheral wall 2 on an upstream side in the combustion chamber 10. The fuel concentration in this low velocity zone, which is shown as "B" in FIG. 4, is liable to become higher (thicker). Hence, the flame 5 generated at the low velocity zone B spreads toward the upstream side, that is, toward the nozzles 3, 4, along the vicinity of the inner surface of the peripheral wall 2, so that a combustion is caused there in which the mixing of fuel and air is incomplete, or a combustion is caused there in which a cross sectional combustion load is high. As a result, in the gas turbine using the prior art combustor 7, there arise problems of an increased discharge of $NO_x$ (nitrogen oxides) due to an elevation of combustion temperature, an increase of combustion vibration due to rapid combustion, etc. in the combustion chamber 10.

SUMMARY OF THE INVENTION

It is therefore an object of the present invention to provide a gas turbine combustor, having a steam-cooled wall of a combustion chamber, in which an increase of fuel concentration at a low velocity zone of the flow of the fuel and air mixture in the vicinity of an inner surface of the steam-cooled wall can be suppressed so as to reduce $NO_x$ discharge and so as to suppress combustion vibration.

In order to attain the object, a first aspect of the the present invention is a gas turbine combustor having a combustion chamber of which a peripheral wall is a steam-cooled wall constructed such that an air hole is bored for injecting air therethrough in the peripheral wall on an upstream side of the combustion chamber and air is supplied through the air hole to the vicinity of an inner surface of the peripheral wall.

Also, a second aspect of the present invention is a gas turbine combustor as mentioned in the first aspect constructed such that there is connected an air tube to an inlet side of the air hole and air supplied from a gas turbine compressor is led into the air hole through the air tube.

In the combustion chamber of the gas turbine combustor mentioned above, combustion air is supplied thereinto from the compressor and fuel is injected into the combustion air through a pilot nozzle and main nozzles. At this time, there is formed a low velocity zone of fuel and air flow in the vicinity of the inner surface of the peripheral wall on the upstream side of the combustion chamber, that is, near the nozzles, and the fuel concentration at this low velocity zone becomes higher (thicker).

Nevertheless, in the present invention, air for dilution is supplied into this low velocity zone of fuel and air flow in the combustion chamber, and hence there is formed a film flow of this dilution air in the vicinity of the inner surface of the peripheral wall in the low velocity zone. Due to this film flow, fuel and air are accelerated to be mixed, and an increase in fuel concentration there is suppressed.

Also, the flame developing from a central portion of the combustion chamber is thereby prevented from spreading toward the upstream side along the inner surface of the peripheral wall. Hence an increase of the combustion temperature due to spreading of the flame and an accompanying increase of $NO_x$ discharge can be suppressed, and combustion vibration due to a rapid increase of combustion pressure and temperature can also be prevented from occurring.

According to the second aspect of the present invention, the dilution air to be led into the air hole is supplied from the gas turbine compressor. Thus there is no need to provide a specific compressed air supply means, such as an exclusive air compressor, and dilution air of high pressure can be obtained by means of a simple construction and at low cost.

According to the present invention constructed as above, the effect thereof is summarized as follows: the dilution air is supplied through the air hole into the low velocity zone of fuel and air flow in the vicinity of the inner surface of the peripheral wall on the upstream side of the combustion chamber, and thereby the mixing of fuel and air is accelerated and an increase of fuel concentration in the low velocity zone can be suppressed. Thus, the combustion flame is prevented from spreading to the low velocity zone, and an increase of the combustion temperature due to spreading of the flame and an accompanying increase of $NO_x$ discharge therewith are suppressed, and combustion vibration due to a rapid increase of combustion pressure and temperature is prevented.

Accordingly, in the present invention, by use of the very simple and low cost arrangement of providing the air hole in the peripheral wall of the combustion chamber, there is obtained a gas turbine in which $NO_x$ discharge is reduced and combustion vibration is prevented.

Also, by supplying the dilution air to be led into the air hole from the gas turbine compressor, there is no need to provide a specific air supply means, such as an air compressor, and the dilution air can be obtained by very simple and low cost means.

DESCRIPTION OF THE PREFERRED EMBODIMENTS

Figure 1:
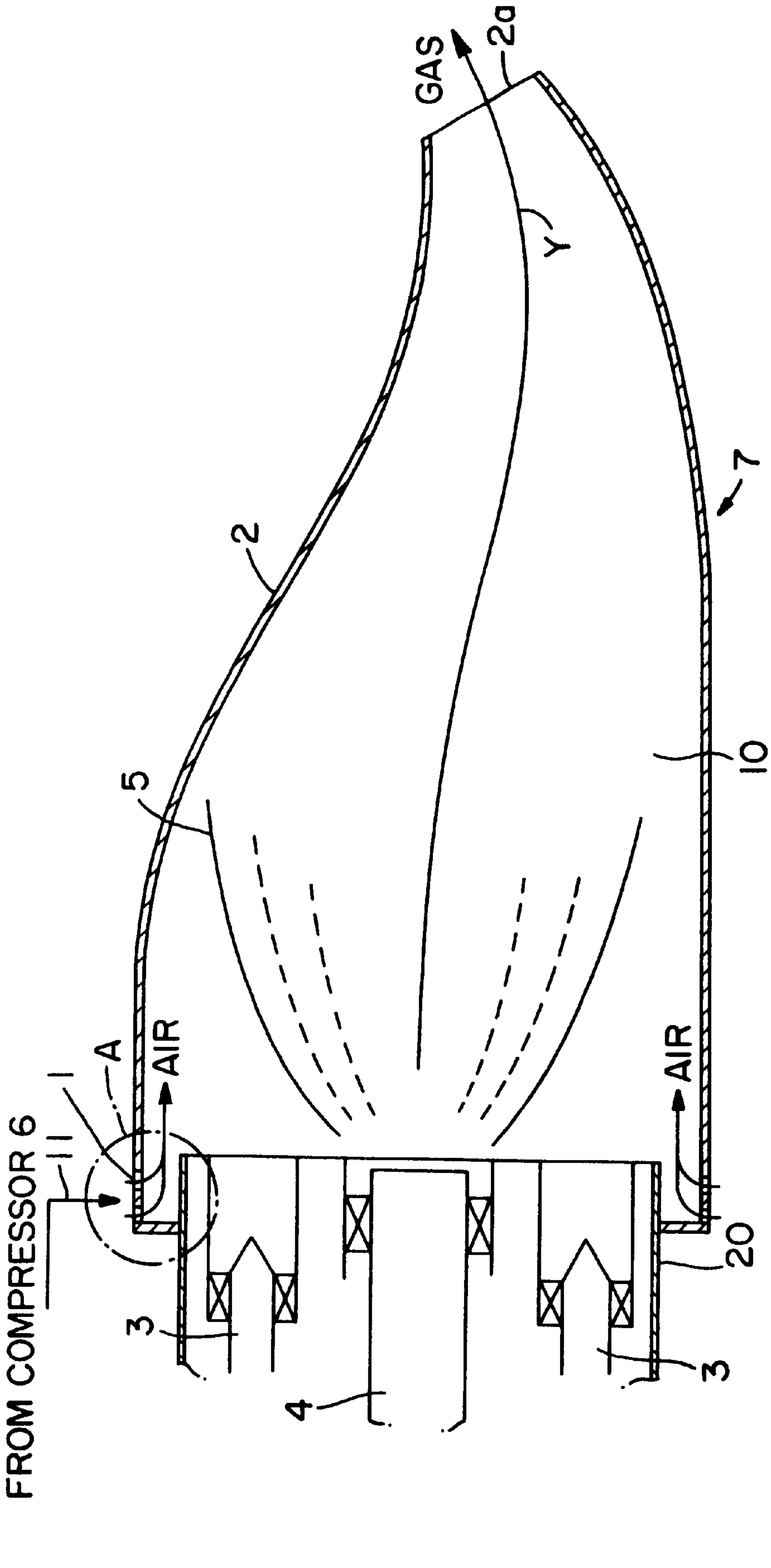
FIG. 1 is a cross sectional view of a main part of a gas turbine combustor of an embodiment according to the present invention.

In FIG. 1, which shows an embodiment according to the present invention, numeral 2 designates a peripheral wall, which is a steam-cooled wall constructed such that steam flows in the wall for cooling of the wall surface. The steam has been generated at the exhaust gas boiler 9, shown in FIG. 3, to do expansion work at a steam turbine (not shown) and thus has been temperature-reduced to a certain level to be used as a cooling steam.

Figure 3:
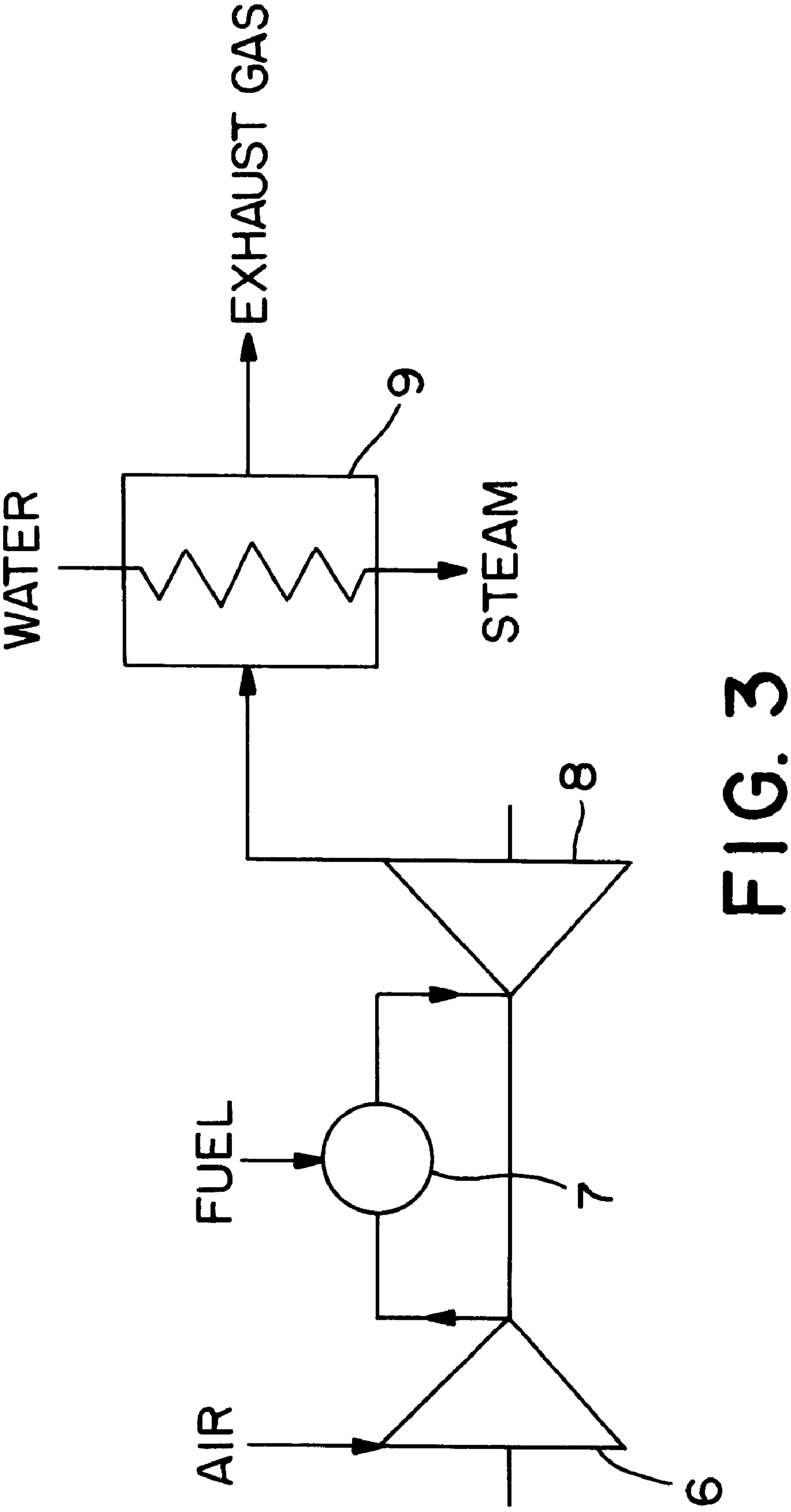
FIG. 3 (PRIOR ART)
FIG. 3 is a constructional view of a conventional gas turbine plant.
Figure 4:
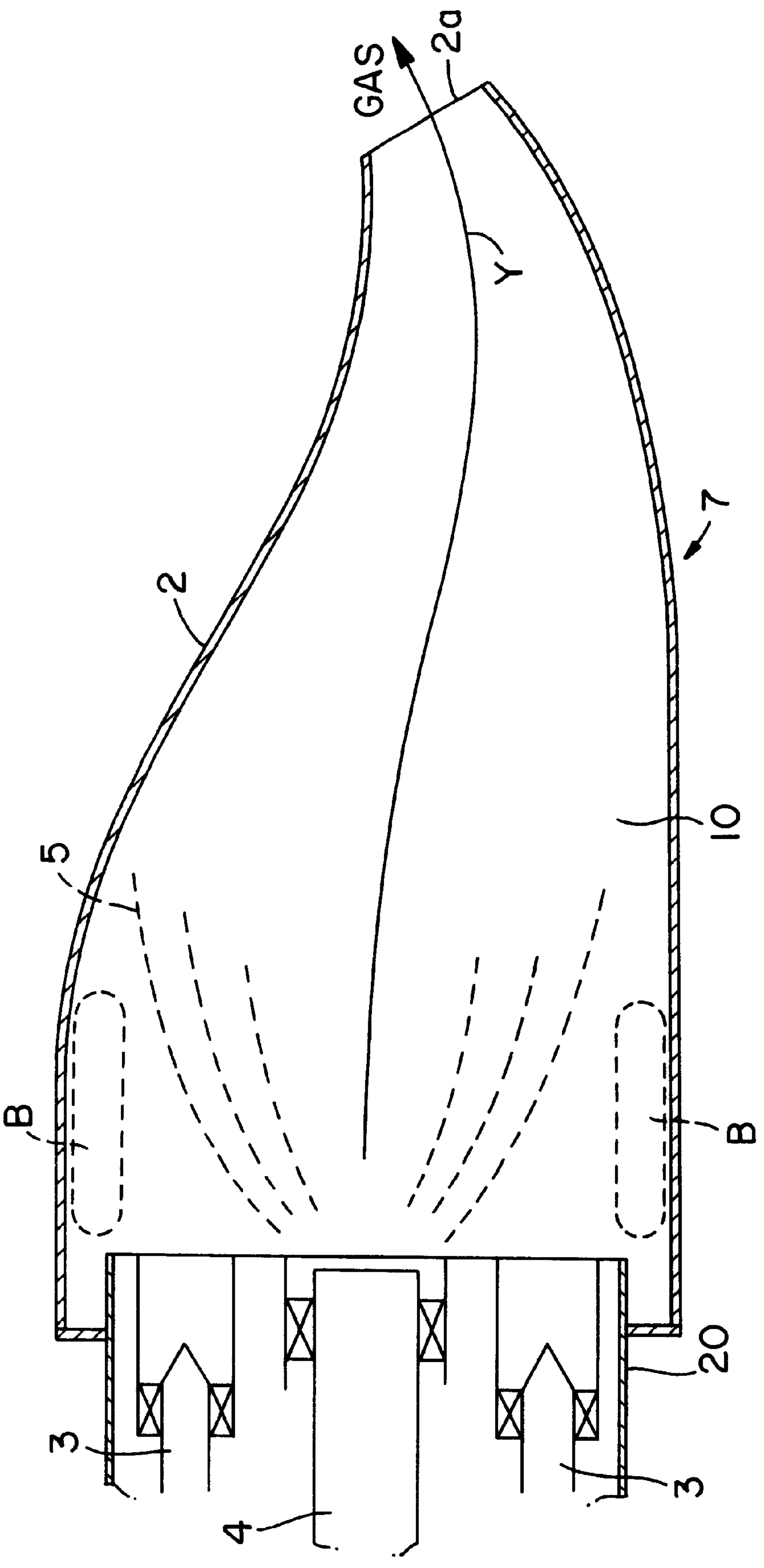
FIG. 4 (PRIOR ART)
FIG. 4 is a cross sectional view of a main part of one example of a prior art gas turbine combustor.

Numeral 10 designates a combustion chamber, which is surrounded by the peripheral wall 2, and is constructed such that combustion air from the compressor 6, shown in FIG. 3, is led thereinto through a wall portion 20 on an upstream side thereof. Also, in the wall portion 20 on the upstream side of the combustion chamber 10, there is provided a pilot nozzle 4 at a central portion thereof. Also provided are a plurality of main nozzles 3, arranged with equal intervals along a circumferential direction of the combustor 7, shown in FIG. 3, on an outer side of the pilot nozzle 4. Numeral 2*a* designates a combustion gas outlet. The above-mentioned construction is the same as that in the prior art shown in FIG. 4.

Figure 2:
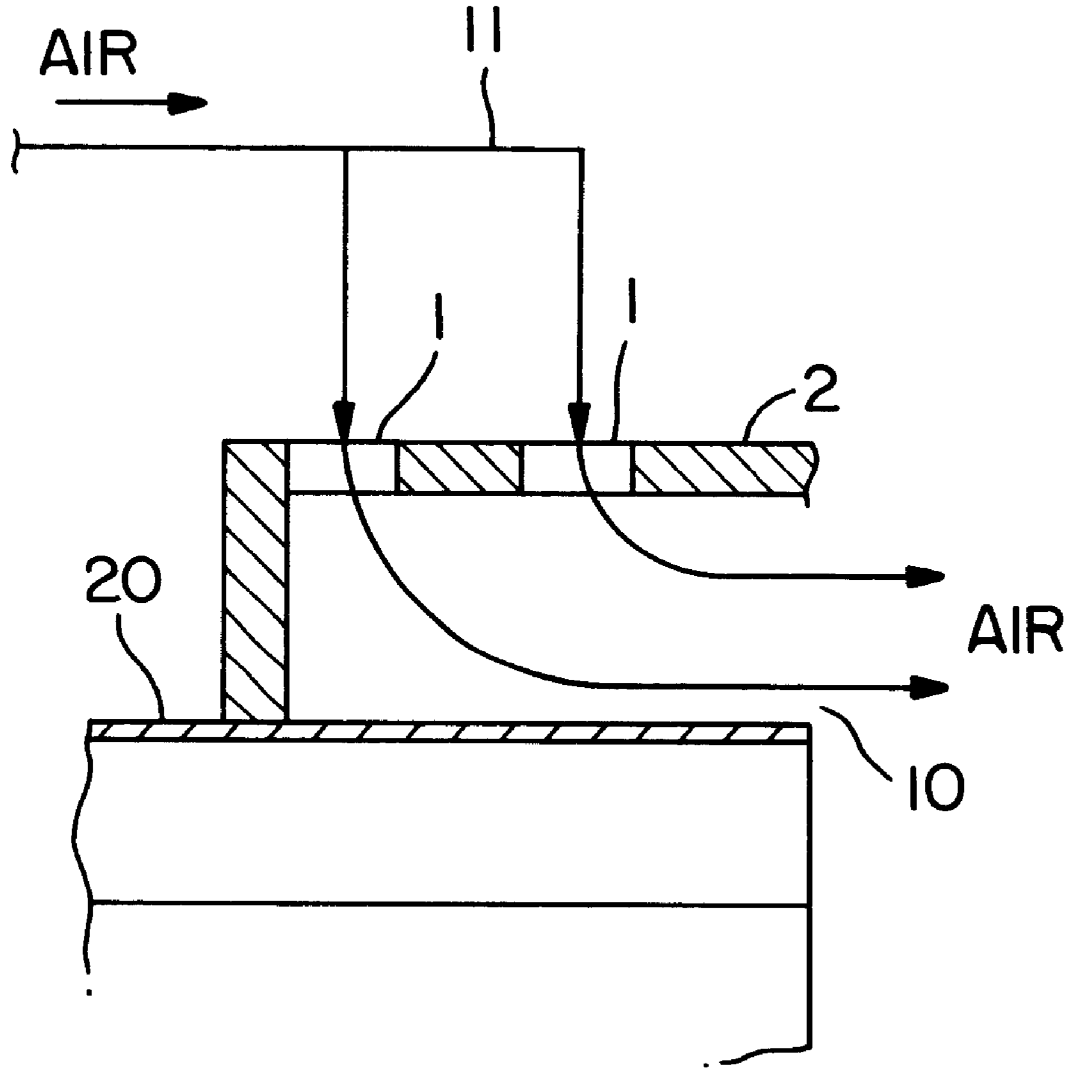
FIG. 2 is an enlarged cross sectional view of a portion "A" of FIG. 1.

In the present invention, the peripheral wall 2 of the combustor 7, is improved as follows. As shown in FIGS. 1 and 2, FIG. 2 being an enlarged view of portion "A" of FIG. 1, there are bored a plurality of air holes 1 in the peripheral wall 2 with appropriate intervals therebetween along a circumferential direction of the combustor 7 at position on an upstream side of the peripheral wall 2 of the combustor 7, that is, at position on an outer side of the main nozzles 3. The air holes 1 are provided in one row or in plural rows (two rows in the present embodiment) and each is provided with an air tube 11 connecting to an outlet of the compressor 6 so that pressurized air from the outlet of the compressor 6 is led therethrough to be injected into the combustion chamber 10 via the air holes 1.

In operation of the combustor 7 constructed as mentioned above, fuel is injected from the pilot nozzle 4 into the combustion air in the combustion chamber 10 to be ignited and then main fuel is injected from the plurality of main nozzles 3 into the flame so ignited to be mixed and burned with the air in the combustion chamber 10 and generate combustion flame 5. Combustion gas so generated flows out of the outlet 2*a* of the combustion chamber 10 to be sent to the gas turbine 8 for driving thereof.

While combustion takes place in the combustion chamber 10, there is formed a low velocity zone of fuel and air flow in the vicinity of the inner surface of the peripheral wall 2 on the upstream side of the combustion chamber 10, that is, near the nozzles 3, 4. So, in the prior art combustor, fuel and air are not mixed sufficiently together in this low velocity zone and the fuel concentration becomes higher (thicker) there.

In the combustor of the present invention, however, air for dilution is supplied into the low velocity zone of fuel and air flow via the plurality of air holes 1 bored in the peripheral wall 2, as shown in FIG. 2, hence there is formed a film flow of this dilution air in the vicinity of the inner surface of the peripheral wall 2 in the low velocity zone and, due to this film flow, fuel and air are accelerated to be mixed and an increase of the fuel concentration in the low velocity zone is suppressed.

According to the present embodiment, the flame developing from a central portion of the combustion chamber 10 is prevented from spreading toward the upstream side, hence an increase of the combustion temperature due to spreading of the flame and an accompanying increase of $NO_x$ discharge can be suppressed. Also, combustion vibration due to rapid increase of combustion pressure and temperature can be prevented from occurring.

Further, according to the present embodiment, the air to be led into the air hole is supplied from the compressor 6 of the gas turbine, hence there is no need to provide a specific compressed air supply means, such as an exclusive air compressor, and moreover, air of a high pressure can be supplied.

The invention has been described by use of the embodiments as illustrated in the figures, but the invention is not limited thereto and can be supplemented with various modifications to the structure within the scope of the claims as hereafter appended.

What is claimed is:

1. A gas turbine combustor comprising:

a combustion chamber having a steam-cooled peripheral wall, said combustion chamber having a central portion, an upstream side and a downstream side;

a pilot nozzle provided at said central portion of said combustion chamber and a plurality of main nozzles provided around said pilot nozzle, wherein said pilot nozzle and said plurality of main nozzles are provided at said upstream side of said combustion chamber; and an air hole bored through said peripheral wall at said upstream side of said combustion chamber for injecting dilution air through said peripheral wall to the vicinity of an inner surface of said peripheral wall.

2. The gas turbine combustor of claim 1, wherein said air hole has an inlet side connected to an air tube, and said air tube is connected to a gas turbine compressor so as to supply air from said gas turbine compressor to said air hole.

3. The gas turbine combustor of claim 1, wherein a combustion air supply is provided on said upstream side of said combustion chamber with said pilot nozzle and said main nozzles.

4. The gas turbine combustor of claim 3, wherein said combustion air supply comprises a wall portion extending axially to said upstream side of said combustion chamber, said wall portion surrounding said pilot nozzle and said main nozzles.

5. The gas turbine combustor of claim 1, wherein a plurality of air holes are bored through said peripheral wall and spaced around said upstream side of said combustion chamber radially outward of said pilot nozzle and said main nozzles for injecting dilution air to the vicinity of the inner surface of said peripheral wall.

* * * * *